Jan. 24, 1967 U. P. RONALD ET AL 3,300,573

COMPOSITE SHIELD FOR ELECTRIC CABLES

Filed June 3, 1965

*INVENTORS*
ULRICH PAUL RONALD
ROGER J. LEMIEUX

AGENT

Curphey & Erickson 3,300,573

COMPOSITE SHIELD FOR ELECTRIC CABLES

Ulrich Paul Ronald, Roxboro, Quebec, and Roger J. Lemieux, Ormeaux, Quebec, Canada, assignors to Northern Electric Company Limited, Montreal, Quebec, Canada Filed June 3, 1965, Ser. No. 461,085
9 Claims. (Cl. 174—106)

This invention relates to composite shields for electric cables and to the method of applying the shields to the cables. Specifically, the invention is concerned with composite shields including at least one metallic layer.

Certain types of electric cables such as coaxial cables used in telephony and television for transmitting high frequencies, have a composite shield including two consecutive metal tapes. In many coaxial cables, the inner tape extends longitudinally of the cable and is folded into a tube to form an outer conductor coaxial with the central conductor of the cable, from which it is separated by an insulating layer. The outer tape is wrapped helically about the tube formed by the inner tape to provide mechanical reinforcement and electro-magnetic shielding.

The inner tape is applied longitudinally because it has greater conductivity in this form than in the more flexible helical configuration. The flexibility of the longitudinal tape is improved by making the tape as thin as transmission conditions will allow. In spite of this attention to flexibility, however, the tape is susceptible to random wrinkling when the cable is flexed which frequently causes cracks in the tape. These cracks seriously affect the conductivity of the tape and are otherwise generally undesirable. Also, the wrinkles in the tape may indent the underlying insulating layer creating undesirable variations in the local impedances.

It has been discovered according to the present invention that random wrinkling of the inner tape in coaxial cables can be virtually eliminated by wrapping the outer metal tape tightly around the inner tape to form ridges in the inner tape at the discontinuity between adjacent turns of the outer tape. A preferred formation of the discontinuity is the space between adjacent turns when the outer tape is wound in an open helix, but it may also be the small space underlying each turn of the tape at the leading edge of the immediately preceding turn where the tape is applied in overlapping fashion. The formation of the ridge concentrates and controls the wrinkling to the extent that the remaining portions of the inner tape underlying the outer tape are wrinkle-free and, at the same time, the cable has greater flexibility. Neither do the upstanding ridges indent the underlying insulating layer as did the wrinkles. Although this was found to be the case where the inner tape was soft thin copper and the outer tape was thin steel, it will be realized, of course, that for the purpose of the invention, the outer tape could be of any material so long as it is strong enough to form the ridges in the inner metallic tape.

Preferred embodiments of the invention will now be described with reference to the attached drawings in which.

Figures 1, 2:
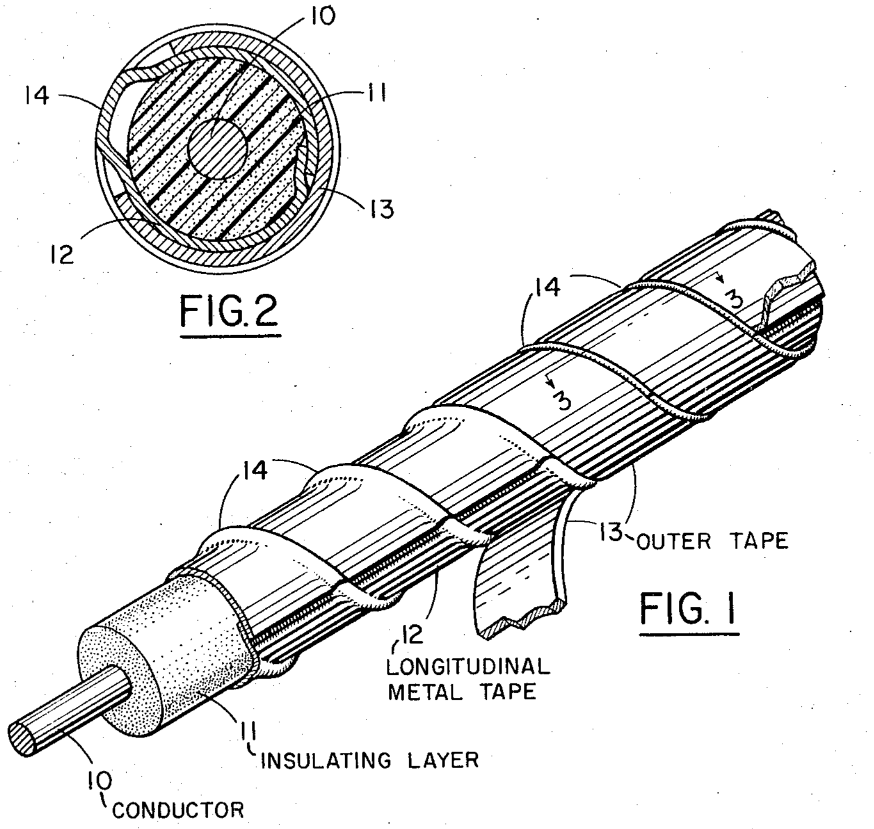
FIGURE 1 is a perspective view of a coaxial cable having a composite shield in accordance with the present invention in which the outer tape is wound in an open helix.
FIGURE 2 is a transverse cross-section of the cable in FIGURE 1.

The coaxial cable as shown in FIGURES 1 and 2 has a core consisting of a central conductor 10 embedded in a layer 11 of insulating material such as expanded polyethylene. The cable core is enclosed by a metal tape 12 extending longitudnially of the cable and folded about the insulating layer 11 into a tube with its edges in overlapping electrical contact. The tube, which is preferably of copper, is the outer conductor of the cable in coaxial relation with the central conductor 10. The tape 12 is applied longitudinally for reasons of conductivity and economy, and is as thin as transmission requirements will permit for economy and flexibility.

Figure 3:
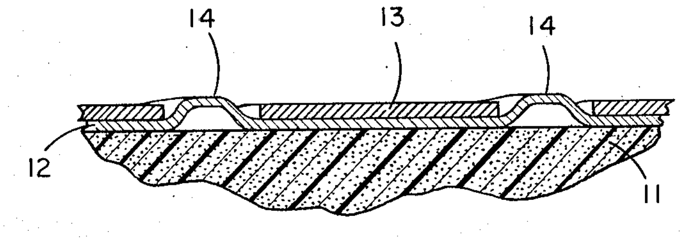
FIGURE 3 is a partial section taken on line 3—3 in FIGURE 1.

A thin steel outer tape 13 is applied over the inner tape 12 as a mechanical reinforcement and electro-magnetic shield. The outer tape is wrapped in an open helix with a space between adjacent turns. According to the invention, the outer tape 13 is applied with sufficient tension to deform the smooth inner tape 12 into upstanding ridges 14 between the turns of the outer tape. The ridges are clearly shown in FIGURE 3. Actually, the ridges 14 of FIGURE 3 are but one unbroken ridge following the helical gap between the adjacent turns of the outer tape 13. Although some drawing of the inner tape 12 may take place, the formation of the ridges 14 is due mainly to accumulation of slack in the inner tape.

As stated previously, it has been discovered that the ridges 14 concentrate and control wrinkling of the inner tape 12 when the cable is flexed. Even when the cable is repeatedly bent on a relatively sharp curvature, the portions of the inner tape 12 underlying the turns of the outer tape 13 remain wrinkle-free and the ridges 14 do not indent the insulation layer 11.

Figure 4:
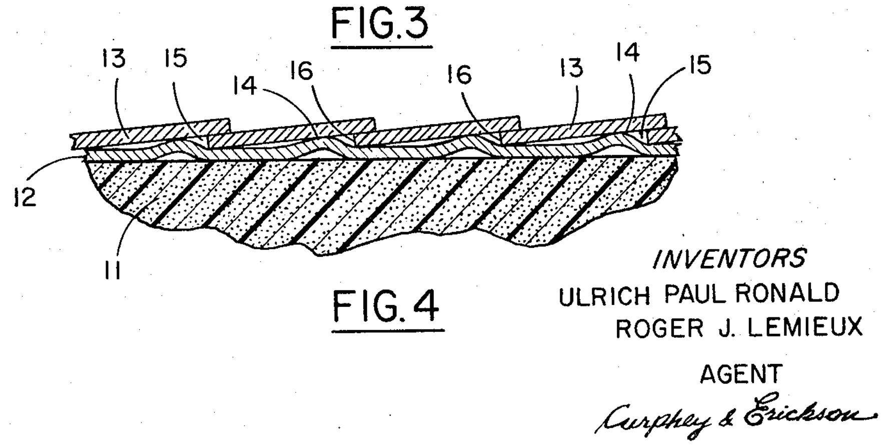
FIGURE 4 is a view similar to FIGURE 3 in which the outer tape is applied in overlapping fashion.

When the outer tape 13 is in overlapping fashion as shown in FIGURE 4, the upstanding ridge 14 is formed in the discontinuity or space 15 underlying each turn of the tape at the leading edge 16 of the immediately preceding turn.

Of course, it will be understood by persons skilled in the art that the essence of the invention resides in the formation of a regular arrangement of upstanding ridges on the metallic tube in the discontinuity between adjacent turns of the outer tape by the application of the outer tape under tension. The construction of the core of the cable is immaterial so long as it provides adequate support for the inside of the tube to permit the formation of the ridges. Nor is the actual material of the outer tape significant so long as it is strong and hard enough to deform the tube as required. The cable may have one or more layers enclosing the composite shield. Furthermore, a plurality of cables embodying the composite shield of this invention may be combined as sub-units of a larger cable.

What is claimed is:

1. An electric cable comprising an elongated conductor, a layer of insulating material surrounding the conductor, a continuous metal tube surrounding the layer of insulating material, and a succession of turns of strip material encompassing the tube with a discontinuity between the adjacent turns of the strip material, said strip material being under sufficient tension to form an upstanding ridge in the tube along said discontinuity.

2. A composite shield as defined in claim 1 wherein the material of the strip is metal.

3. An electric cable comprising an elongated conductor, a layer of insulating material surrounding the conductor, a first metal tape extending longitudinally of the cable and folded about the layer of insulating material to form a surrounding continuous tube with the edges of the tape in electrical contact, and a second metal tape encompassing the tube helically with adjacent turns overlapping to form a discontinuity under each turn at the leading edge of the immediately preceding turn, the second tape being under sufficient tension to form an upstanding ridge in the tube along said discontinuity.

4. A composite metallic shield as defined in claim 3 wherein the first tape is copper and the second tape is steel.

5. An electric cable comprising an elongated conductor, a layer of insulating material surrounding the conductor, a first metal tape extending longitudinally of the cable and folded about the layer of insulating material to form a surrounding continuous tube with the edges of the tape in electrical contact, and a second metal tape encompassing the tube helically with adjacent turns spaced apart and the second tape being under sufficient tension to form an upstanding ridge in the tube between adjacent turns of the second tape.

6. Method of forming a composite shield on an electric cable comprising the steps of forming a metal tube on the cable, and wrapping strip material around the tube, the strip being applied with sufficient tension to deform the tube into an upstanding ridge at a discontinuity between adjacent turns of the strip.

7. Method of forming a composite shield as defined in claim 6 wherein the strip material is applied in overlapping fashion with the ridge being formed at the discontinuity under each turn at the leading edge of the immediately preceding turn.

8. Method of forming a composite shield as defined in claim 6 wherein the strip material is wrapped around the tube in an open helix.

9. Method of forming a composite metallic shield on an electric cable comprising the steps of applying a first metal tape longitudinally to the cable and folding it thereabout into a tube, and helically wrapping a second metal tape around the tube with a space between adjacent turns, the second tape being applied under sufficient tension to deform the tube between adjacent turns of the second tape into an upstanding ridge.

References Cited by the Examiner

UNITED STATES PATENTS 916,741 3/1909 Lutz ---------------- 174—109

FOREIGN PATENTS 493,903 6/1953 Canada.

LEWIS H. MYERS, *Primary Examiner.*

H. HUBERFELD, *Assistant Examiner.*

UNITED STATES PATENT OFFICE

CERTIFICATE OF CORRECTION

Patent No. 3,300,573 January 24, 1967

Ulrich Paul Ronald et al.

It is certified that error appears in the above identified patent and that said Letters Patent are hereby corrected as shown below:

Column 1, before line 10, insert the following paragraph:
This application is a continuation-in-part of application Serial No. 446,306, filed October 26, 1964, and now abandoned.

Signed and sealed this 29th day of July 1969.

(SEAL)
Attest:

Edward M. Fletcher, Jr.
Attesting Officer

WILLIAM E. SCHUYLER, JR.
Commissioner of Patents